US 8,732,431 B2

United States Patent
Culley et al.

(10) Patent No.: US 8,732,431 B2
(45) Date of Patent: May 20, 2014

(54) LOGICAL ADDRESS TRANSLATION

(75) Inventors: Martin L. Culley, Boise, ID (US); Troy A. Manning, Meridian, ID (US); Troy D. Larsen, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 433 days.

(21) Appl. No.: 13/041,402

(22) Filed: Mar. 6, 2011

(65) Prior Publication Data

US 2012/0226887 A1  Sep. 6, 2012

(51) Int. Cl.
*G06F 12/00* (2006.01)
*G06F 12/02* (2006.01)
*G06F 12/04* (2006.01)
*G06F 12/10* (2006.01)
*G06F 12/14* (2006.01)
*G06F 3/06* (2006.01)

(52) U.S. Cl.
CPC ............ *G06F 12/00* (2013.01); *G06F 12/0292* (2013.01); *G06F 12/04* (2013.01); *G06F 12/10* (2013.01); *G06F 12/1027* (2013.01); *G06F 12/1475* (2013.01); *G06F 3/0665* (2013.01)
USPC ............... 711/202; 711/6; 711/200; 711/203; 711/205; 711/206; 711/207; 711/213; 711/E12.016; 711/E12.058; 711/E12.059

(58) Field of Classification Search
CPC ..... G06F 12/00; G06F 12/0292; G06F 12/04; G06F 12/10; G06F 12/1027; G06F 12/1475; G06F 3/0665
USPC ............. 711/6, 200, 202, 203, 205, 206, 207, 711/213, E12.016, E12.058, E12.059
See application file for complete search history.

(56) References Cited

U.S. PATENT DOCUMENTS

| 7,480,766 | B2 | 1/2009 | Gorobets | |
| 2001/0048121 | A1* | 12/2001 | Mizushima et al. | 257/200 |
| 2007/0168689 | A1 | 7/2007 | Blacquiere et al. | |
| 2008/0046641 | A1 | 2/2008 | Lasser | |
| 2008/0263369 | A1 | 10/2008 | Min et al. | |
| 2010/0088525 | A1* | 4/2010 | Ureche et al. | 713/193 |
| 2010/0228904 | A1 | 9/2010 | Buhr et al. | |
| 2012/0278529 | A1* | 11/2012 | Hars et al. | 711/103 |

FOREIGN PATENT DOCUMENTS

JP  2009-258948 A  11/2009

OTHER PUBLICATIONS

International Search Report and Written Opinion for related PCT Application No. PCT/US2012/027265, mailed Sep. 25, 2012, (10 pgs.).

* cited by examiner

*Primary Examiner* — Midys Rojas
(74) *Attorney, Agent, or Firm* — Brooks, Cameron & Huebsch, PLLC

(57) ABSTRACT

The present disclosure includes methods for logical address translation, methods for operating memory systems, and memory systems. One such method includes receiving a command associated with a LA, wherein the LA is in a particular range of LAs and translating the LA to a physical location in memory using an offset corresponding to a number of physical locations skipped when writing data associated with a range of LAs other than the particular range.

26 Claims, 2 Drawing Sheets

| KEY | LBA RANGE | | OFFSET | |
|---|---|---|---|---|
| | | | | TOTAL |
| a | 0-127 | 372-1 | 0 | 0 |
| b | 128-255 | 372-2 | 7 | 7 |
| c | 256-383 | 372-3 | 7 | 14 |
| d | 384-511 | 372-4 | 1 | 15 |
| e | 512-639 | 372-5 | 6 | 21 |

LOGICAL ADDRESS TRANSLATION

TECHNICAL FIELD

The present disclosure relates generally to semiconductor memory devices, methods, and systems, and more particularly, to logical address translation.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored information when not powered and can include NAND flash memory, NOR flash memory, read only memory (ROM), Electrically Erasable Programmable ROM (EEPROM), Erasable Programmable ROM (EPROM), and phase change random access memory (PCRAM), among others.

Memory devices can be combined together to form a solid state drive (SSD). A solid state drive can include non-volatile memory, e.g., NAND flash memory and NOR flash memory, and/or can include volatile memory, e.g., DRAM and SRAM, among various other types of non-volatile and volatile memory. Flash memory devices, including floating gate flash devices and charge trap flash (CTF) devices using semiconductor-oxide-nitride-oxide-semiconductor and metal-oxide-nitride-oxide-semiconductor capacitor structures that store information in charge traps in the nitride layer, may be utilized as non-volatile memory for a wide range of electronic applications. Flash memory devices typically use a one-transistor memory cell that allows for high memory densities, high reliability, and low power consumption.

An SSD can be used to replace hard disk drives as the main storage device for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives. SSD manufacturers can use non-volatile flash memory to create flash SSDs that may not use an internal battery supply, thus allowing the drive to be more versatile and compact.

An SSD can include a number of memory devices, e.g., a number of memory chips (as used herein, "a number of" something can refer to one or more of such things, e.g., a number of memory devices can refer to one or more memory devices). As one of ordinary skill in the art will appreciate, a memory chip can include a number of dies and/or logical units (LUNs). Each die can include a number of memory arrays and peripheral circuitry thereon. The memory arrays can include a number of memory cells organized into a number of physical pages, and the physical pages can be organized into a number of blocks.

SSDs can include a logical address (LA) table, such as a logical block address (LBA) table. An LBA table can be used to record the information that translates, e.g., links, the logical address of data to the physical location of the data in the memory arrays of an SSD. The LBA table can be stored in volatile memory in the solid state drive and a copy of the LBA table can also be stored in non-volatile memory in the solid state drive. The LBA table can be used to translate, e.g., locate, the physical location of data in the solid state drive when a command, e.g., read request and/or write request, is initiated in the solid state drive. A read and/or write request for reading and/or writing data at a specific logical address can be initiated by a host. The logical address can be found in the LBA table and a corresponding physical address can then be indicated. The solid state drive can read the data from the indicated physical address to complete the read request for the solid state drive and/or the solid state drive can write the data to the indicated physical address to complete the write request for the solid state drive.

Encrypted data can be stored in the solid state memory devices and there are instances in which a host may treat a range of LBAs as a group. For example, encryption keys can be associated with particular LBA ranges. The number of encryption keys can be used to encrypt data stored in the memory devices.

DETAILED DESCRIPTION

Figure 1:
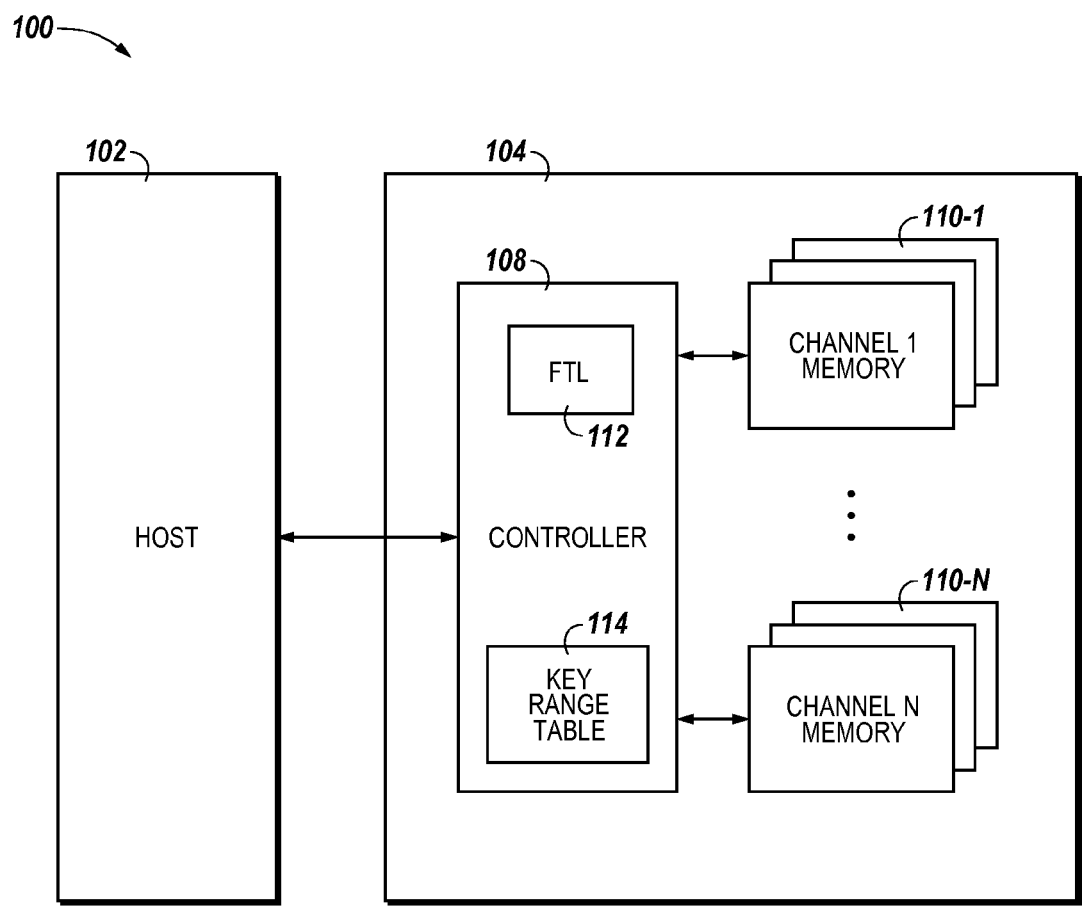
FIG. 1 is a functional block diagram of a computing system including at least one memory system, in accordance with one or more embodiments of the present disclosure.

The present disclosure includes methods for logical address translation. One such method includes receiving a command associated with a LA, wherein the LA is in a particular range of LAs and translating the LA to a physical location in memory using an offset corresponding to a number of physical locations skipped when writing data associated with a range of LAs other than the particular range.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N", particularly with respect to reference numerals in the drawings, indicates that a number of the particular feature so designated can be included with one or more embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a functional block diagram of a computing system 100 including at least one memory system 104, in accordance with one or more embodiments of the present disclosure. In the embodiment illustrated in FIG. 1, the memory system 104, e.g., a solid state drive (SSD), can include a controller 108 and one or more solid state memory devices 110-1, ..., 110-N. The solid state memory devices 110-1, ..., 110-N can provide a storage volume for the memory system, e.g., with a file system formatted to the memory devices. The controller 108 can include control circuitry, e.g., hardware, firmware, and/or software. In one or more embodiments, the controller 108 can be an application specific integrated circuit (ASIC) coupled to a printed circuit board including a physical interface and solid state memory devices 110-1, ..., 110-N.

As illustrated in FIG. 1, the controller 108 can be coupled to the solid state memory devices 110-1, ..., 110-N. A host 102 can use logical block addresses (LBAs) when addressing a memory system 104. A flash translation layer (FTL) 112 can translate an LBA to a physical location in the solid state memory devices 110-1, ..., 110-N, and vice versa. This allows the host 102 to ignore the physical characteristics of the memory devices 110-1, ..., 110-N and treat the memory system 104 as a contiguous linear map of logical sectors. Host 102 can be a laptop computer, personal computes, digital camera, digital recording and playback device, mobile telephone, PDA, memory card reader, interface hub, among other host systems, and can include a memory access device, e.g., a processor. One of ordinary skill in the art will appreciate that "a processor" can intend one or more processors, such as a parallel processing system, a number of coprocessors, etc.

In one or more embodiments, a physical host interface can be in the form of a standardized interface. For example, when the memory system 104 is used for data storage in a computing system 100, a physical host interface can be a serial advanced technology attachment (SATA), peripheral component interconnect express (PCIe), or a universal serial bus (USB), among other connectors and interfaces. In general, however, a physical host interface can provide an interface for passing control, address, data, and other signals between the memory system 104 and a host 102 having compatible receptors for the physical host interface.

The controller 108 can communicate with the solid state memory devices 110-1, ..., 110-N to read, write, and erase data, among other operations. Controller 108 can have circuitry that may be one or more integrated circuits and/or discrete components. As illustrated in FIG. 1, the controller 108 can include a logical to physical translation function, e.g., flash translation layer (FTL) 112. The FTL 112 can be used to map logical addresses associated with a request received from the host 102 to physical locations within the solid state memory devices 110-1, ..., 110-N. As described further herein, the FTL 112 can use information in a key range table 114 (included in the controller, but which may also be stored in the memory devices 110) that indicates an offset, for translating an LBA to a physical location. A memory controller could selectively couple an I/O connection (not shown in FIG. 1) of a solid state memory device 110-1, ..., 110-N to receive the appropriate signal at the appropriate I/O connection at the appropriate time. Similarly, the communication protocol between a host 102 and the memory system 104 may be different than what is required for access of a solid state memory device 110-1, ..., 110-N. Controller 108 could then translate the commands received from a host into the appropriate commands to achieve the desired access to a solid state memory device 110-1, ..., 110-N.

A solid state memory device 110-1, ..., 110-N can include one or more arrays of memory cells, e.g., non-volatile memory cells. The arrays can be flash arrays with a NAND architecture, for example. In a NAND architecture, the control gates of memory cells of a "row" can be coupled with an access, e.g., word, line, while the memory cells can be coupled in series source to drain in a "string" between a select gate source transistor and a select gate drain transistor. The string can be connected to a data, e.g., bit, line by the select gate drain transistor. The use of the terms "row" and "string" implies neither a linear nor an orthogonal arrangement of memory cells. As will be appreciated by those of ordinary skill in the art, the manner of connection of the memory cells to the bit lines and source lines depends on whether the array is a NAND architecture, a NOR architecture, or some other memory array architecture.

The solid state memory devices 110-1, ..., 110-N can include a number of memory cells that can be grouped. As used herein, a group can include one or more memory cells, such as a page, block, plane, die, an entire array, or other groups of memory cells. For example, some memory arrays can include a number of pages of memory cells that make up a block of memory cells. A number of blocks can be included in a plane of memory cells. A number of planes of memory cells can be included on a die. As an example, a 128 GB memory device can include 4314 bytes of data per page, 128 pages per block, 2048 blocks per plane, and 16 planes per device.

The solid state memory devices 110-1, ..., 110-N can include a number of channels, and each channel can include a number of dies. Each channel can be organized using logical unit numbers (LUNs). When writing data to the solid state memory devices 110-1, ..., 110-N, data can be striped across the number of channels and LUNs. Data can be written to the solid state memory devices 110-1, ..., 110-N using a write pattern algorithm which stripes the data in a predictive pattern among the memory cells associated with the channels. Writing data can be limited by the ability of a channel to handle data traffic sent to a channel by the host, therefore a number of channels can be used by a memory system to allow more data to be written and read on the number of channels.

Encrypted data can be stored in the solid state memory devices 110-1, ..., 110-N. For example, a number of encryption keys can be used to encrypt data stored in the memory devices 110. Ranges of LBAs can be associated with an encryption key. For example, data associated with $LBA_0$ to $LBA_x$ can be encrypted with encryption key 0, data associated with $LBA_{x+1}$ to $LBA_{2y}$ can be encrypted with encryption key 1, and data associated with $LBA_{2y+1}$ to $LBA_{3z}$ can be encrypted with encryption key 2. In one or more embodiments, a memory system can use 16 different encryption keys to encrypt data.

In a memory device, a physical page can refer to a unit of writing and/or reading, e.g., a number of cells that are written and/or read together or as a functional group of memory cells. An even page and an odd page can be written and/or read with separate writing and/or reading operations. For embodiments including multilevel cells (MLC), a physical page can be logically divided into, for example, an upper page and a lower page of data. For example, one memory cell can contribute one or more bits to an upper page of data and one or more bits to a lower page of data. Accordingly, an upper page and a lower page of data can be written and/or read as part of one writing and/or reading operation, as the logical upper page and logical lower page are both part of the same physical page.

The embodiment of FIG. 1 can include additional circuitry that is not illustrated so as not to obscure embodiments of the present disclosure. For example, the memory system 104 can include address circuitry to latch address signals provided over I/O connections through I/O circuitry. Address signals can be received and decoded by a row decoder and a column decoder to access the solid state memory devices 110-1, ..., 110-N. It will be appreciated by those skilled in the art that the number of address input connections can depend on the density and architecture of the solid state memory devices 110-1, ..., 110-N.

In general, the controller 108 is responsible for converting command packets received from the host system 102, e.g., from a PCIe bus, into command instructions for host-memory translation circuitry and for converting memory responses into host system commands for transmission to the requesting host. For example, host interface circuitry can construct SATA command packets from PCIe based transaction layer packets.

The controller 108 can be configured to translate logical (e.g., host) addresses (e.g., associated with a received command) to physical memory addresses. For example, the FTL 112 in the controller 108 can use entries from the key range table to convert host sector read and write commands to commands directed for specific portions of the solid state memory devices 110-1, ..., 110-N. Each host operation can be translated into single or multi-sector non-volatile memory operation.

In one or more embodiments, data can be written to the memory devices one page at a time. Each page in the memory device can have a number of physical sectors and each physical sector can be associated with an LBA. As an example, a physical page can have 8 physical sectors of data. However, embodiments are not limited to a particular number of physical sectors per physical page. When writing data one page at a time, the data for the page can be associated with, for example, 8 LBAs. In some embodiments, a first number of LBAs, such as 3 LBAs, can be associated with a first encryption key and a second number of LBAs, such as 5 LBAs, can be associated with a second encryption key. When data destined for a page is associated with LBAs that are associated with two different encryption keys, the data can instead be written to two different pages. The data associated with the first number of LBAs can be written to a first page associated with the first encryption key and the data associated with the second number of LBAs can be written to a second page associated with the second encryption key. This can leave a number of physical locations, e.g., sectors, of the page that contains data assigned to the first page without data. For example, the remaining physical sectors of the first page are skipped in the write process. In one or more embodiments of the present disclosure, the skipping of these physical sectors can be accounted for by an offset in a key range table. The FTL can translate an LBA to a shifted physical location based on the information in the key range table.

The controller 108 can use the key range table 114 to translate the physical location of data associated with LBAs. The key range table 114 can include a number of entries that each indicate a respective offset corresponding to a number of physical locations, e.g., physical sectors, skipped when writing a page(s) of data associated with a range(s) of LBAs that precede a range associated with the respective entry. The key range table can include an entry for each encryption key, the range of LBAs associated with the encryption key, and an offset that indicates the number of physical sectors skipped after writing data assigned to the last LBA in a preceding range. When writing data associated with a number of LBAs and associated with an encryption key, the offsets in the key range table from previous ranges of LBAs and encryption keys can be accumulated, e.g., summed together, and used to translate the physical location of data associated with the number of LBAs. The offset used when translating the physical location of data associated with LBAs can be located in the key range table. The offset can be located in the key range table based on an encryption key associated with the LBAs.

Figures 2, 3:
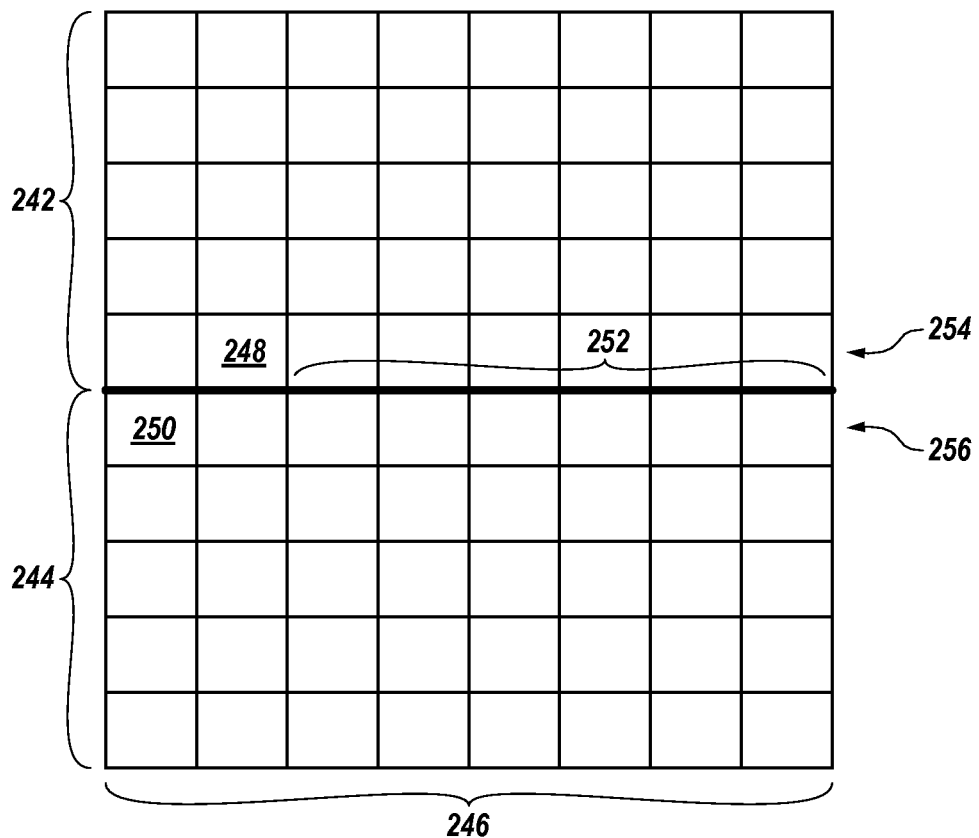
FIG. 2 illustrates a block diagram of key zones in non-volatile memory in accordance with one or more embodiments of the present disclosure.
FIG. 3 illustrates a key range table in accordance with one or more embodiments of the present disclosure.

FIG. 2 illustrates a block diagram of key zones in non-volatile memory in accordance with one or more embodiments of the present disclosure. In FIG. 2, a first number of memory cells can be associated with a first encryption key as indicated by a first key zone 242 and a second number of memory cells can be associated with a second encryption key as indicated by a second key zone 244. The number of memory cells can be arranged into pages, which can be illustrated by a row in FIG. 2. For example, in FIG. 2, page 246 can include a row of physical sectors, wherein each physical sector can include a number of memory cells. A page can include a number of physical sectors, for example, page 246 in FIG. 2 includes 8 physical sectors.

When data is written to pages in memory, the data can be associated with an encryption key of a key zone for encryption/decryption of the data and the data can be associated with a number of LBAs. For example, a command(s) can be received to write data associated with a number of LBAs that are associated with the first encryption key of key zone 242 and a number of LBAs that are associated with the second encryption key of key zone 244. As such, a transition from a number of LBAs associated with one encryption keys to a number of LBAs associated with another encryption key can occur in the middle of a physical page. For instance, the data associated with the last two LBAs associated with the first encryption key of key zone 242 can be written to the first two physical sectors of page 254, ending at physical sector 248. The data associated with the LBAs associated with the second encryption key of key zone 244 can be written to the first six physical sectors of page 256 starting at physical sector 250, e.g., a new physical page. The data associated with the LBAs associated with the first encryption key is written to a different page than the LBAs associated with the second encryption key. For instance, a condition of the FTL may not allow data associated with LBAs associated with different encryption keys to be written on the same page. With the data associated with the LBAs associated with the first encryption key and the data associated with the LBAs associated with the second encryption key written on different physical pages, the last six physical sectors of the page on which sector 248 resides are skipped, e.g., data is not written to those sectors. These skipped physical sectors are noted in a key range table entry along with noting the encryption key associated with the range of LBAs associated the encryption key of key zone 242. In one or more embodiments, any number of physical sectors can be skipped when writing a page of data associated with two or more different encryption keys.

FIG. 3 illustrates a key range table in accordance with one or more embodiments of the present disclosure. The key range table in FIG. 3 includes a number of columns. The first column 360 indicates an encryption key used to encrypt data. The second column 370 indicates LBA ranges associated with particular encryption keys. The third column 380 indicates an LBA offset associated with an encryption key and an LBA range.

In the example shown in FIG. 3, column 360 includes a number of different encryption keys 362-1 ("a"), 362-2 ("b"), 362-3 ("c"), 362-4 ("d"), and 362-5 ("e"). Each encryption key is associated with a respective LBA range 372-1 (LBA range 0-127), 372-2 (LBA range 128-255), 372-3 (LBA range 256-383), 372-4 (LBA range 384-511), and 372-5 (LBA range 512-639).

In one or more embodiments, the LBA offsets in column 380 of the key range table can indicate the number of physical sectors to skip when the FTL, e.g., FTL shown in FIG. 1, translates a LBA to a physical location in a memory system, e.g., system 104 in FIG. 1. Each encryption key 362-1, 362-2, 362-3, 362-4, and 362-5 and associated LBA range 372-1, 372-2, 372-3, 372-4, and 372-5 can have an associated LBA offset. The LBA offset can be based on the skipping of a number of physical sectors within a physical page when transitioning from writing data associated with one encryption key to writing data associated with another, e.g., different, encryption key. In one or more embodiments, the LBA offsets corresponding to particular LBA ranges can be cumulative as the LBA value increases. For instance, the offset used for LBAs associated with an encryption key is the sum of each LBA offset associated with writing data while transitioning between each of the previous encryption keys.

In the example shown in FIG. 3, encryption key 362-1 associated with LBA range 372-1 has an LBA offset of 0. This is because encryption key 362-1 is the first encryption key in the key table such that there are no prior accumulated LBA offsets associated with LBAs associated with encryption key 362-1. As such, the accumulated, e.g., total, LBA offset 382-1 associated with encryption key 362-1 is 0. In this example, encryption key 362-2 associated with LBA range 372-2 has an individual LBA offset of 7. The individual LBA offset of 7 for encryption key 362-2 indicates that 7 physical sectors were skipped in the last page of data associated with encryption key 362-1. The accumulated LBA offset 382-2 for encryption key 362-2 is 7, e.g. the sum of the physical sectors skipped in the last pages of data associated with previous encryption keys in the key range table.

In this example, encryption key 362-3 associated with LBA range 372-3 has an individual LBA offset of 7. The individual LBA offset of 7 for encryption key 362-3 indicates that 7 physical sectors were skipped in the last page of data associated with encryption key 362-2. The accumulated LBA offset 382-3 for encryption key 362-3 is 14, e.g. the sum of the physical sectors skipped in the last pages of data associated with previous encryption keys in the key range table.

In this example, encryption key 362-4 associated with LBA range 372-4 has an individual LBA offset of 1. The individual LBA offset of 1 for encryption key 362-4 indicates that 1 physical sector was skipped in the last page of data associated with encryption key 362-3. The accumulated LBA offset 382-4 for encryption key 362-4 is 15, e.g. the sum of the physical sectors skipped in the last pages of data associated with previous encryption keys in the key range table.

In this example, encryption key 362-5 associated with LBA range 372-5 has an individual LBA offset of 6. The individual LBA offset of 6 for encryption key 362-5 indicates that 6 physical sectors were skipped in the last page of data associated with encryption key 362-4. The accumulated LBA offset 382-5 for encryption key 362-5 is 21, e.g. the sum of the physical sectors skipped in the last pages of data associated with previous encryption keys in the key range table.

CONCLUSION

The present disclosure includes methods for logical block address translation. One such method includes receiving a command associated with a LA, wherein the LA is in a particular range of LAs and translating the LA to a physical location in memory using an offset corresponding to a number of physical locations skipped when writing data associated with a range of LAs other than the particular range.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for logical address (LA) translation, comprising:

receiving a command associated with a LA, wherein the LA is in a particular range of LAs; and translating the LA to a physical location in memory using an offset, wherein the offset corresponds to a number of physical locations that were skipped during a write operation, wherein the write operation included data that was associated with the particular range of LAs and with a range of LAs other than the particular range, and wherein performing the write operation included skipping the number of physical locations so that data associated with the particular range of LAs and data that was associated with the range of LAs other than the particular range are on different pages.

2. The method of claim 1, wherein a first encryption key is applied to data associated with the range of LAs other than the particular range and a second encryption key is applied to data associated with the particular range.

3. The method of claim 1, wherein the method includes locating the offset in a key range table.

4. The method of claim 1, wherein translating comprises adding the offset to the LA prior to locating the physical location in memory.

5. The method of claim 4, wherein translating the LA to the physical location includes skipping a number of physical sectors indicated by the offset.

6. The method of claim 5, wherein skipping the number of physical locations indicated by the offset includes skipping an accumulated total of physical locations skipped during a write operation that included data associated with a range of LAs other than the particular range and a range of LAs that precede the particular range.

7. The method of claim 1, wherein translating comprises translating to a physical sector.

8. The method of claim 1, wherein translating comprises translating the LA to a physical location using an offset corresponding to a number of physical locations skipped during a write operation that included data associated with ranges of LAs that precede the particular range.

9. The method of claim 8, wherein a different encryption key is applied to data of each of the ranges.

10. A method for logical address (LA) translation, comprising:
applying a first offset to data associated with a received LA within a first group of LAs, wherein the first offset corresponds to a number of physical locations that were skipped when writing data associated with a group of LAs that precede the first group of LAs;
applying a second offset to data associated with a received LA within a second group of LAs, wherein the second offset is determined by adding an additional offset to the first offset and the additional offset corresponds to a number of physical locations that were skipped when performing a write operation that included data associated with the first group of LAs and with the second group of LAs and wherein the write operation included skipping the number of physical locations so that data associated with the first group of LAs are on a different page than data associated with the second group of LAs; and
translating the received LA within the second group and having the second offset applied to a physical location in memory.

11. The method of claim 10, wherein a first encryption key is applied to data associated with the first group of LAs and a second encryption key is applied to data associated with the second group of LAs.

12. The method of claim 10, further comprising locating the first offset in a key range table.

13. The method of claim 10, wherein the first offset is based at least partially on a number of physical sectors skipped in a physical page of data associated with a last LA in the group of LAs that precede the first group of LAs.

14. The method of claim 10, wherein the second offset is based at least partially on a number of physical sectors skipped in a physical page of data associated with a last LA of the first group of LAs.

15. The method of claim 14, wherein the second offset comprises the sum of a number of physical sectors skipped in a physical page of data associated with a last LA of the first group of LAs and the first offset.

16. The method of claim 15, further including locating the second offset in a key range table.

17. The method of claim 10, including receiving the LA within the second group from a host and wherein the second offset is applied to the received LA within the second group prior to translating the received LA via a translation layer in a controller.

18. A method for operating a memory system, comprising:
performing a write operation that includes data associated a first group of logical addresses (LAs) and data associated with a second group of LAs by writing data associated with the first group of LAs to a first number of physical sectors, skipping one or more of the first number of physical sectors, and writing data associated with the second group of LAs to a second number of physical sectors, wherein one or more of the first number of physical sectors are skipped so that the data associated with the second group of logical addresses (LAs) is written to a different page than data associated with the first group of LAs and wherein a first encryption key is applied to data associated with the first group of LAs and a second encryption key is applied to data associated with the second group of LAs; and
entering into a key range table a key table entry that indicates a quantity of the first number of physical sectors skipped when writing data associated with the first and second group of LAs,
wherein a LA associated with the second encryption key can be translated to a physical location using the key table entry.

19. The method of claim 18, wherein writing data includes writing data associated with the first group of LAs to a first page and writing data associated with the second group of LAs to a second page.

20. The method of claim 18, wherein using the key range table entry includes offsetting a physical location of data associated with the second group of LAs by the first number of physical sectors skipped when writing data associated with the first group of LAs.

21. The method of claim 18, wherein using the key range table entry includes offsetting a physical location of data associated with the second group of LAs by the first number of physical sectors skipped when writing data associated with first group of LAs and the number of physical sectors skipped when writing data associated with previous groups of LAs.

22. A memory system, comprising:
non-volatile memory; and
a controller coupled to the non-volatile memory and configured to:
apply an encryption key to a particular group of logical addresses (LAs); and
translate a LA associated with a command based on the LA in the particular group of LAs and on a number of physical locations skipped during a write operation that included data associated with the particular group of LAs and a number of groups of LAs other than the particular group, wherein performing the write operation included skipping the number of physical locations so that data associated with the particular range of LAs and data that was associated with the range of LAs other than the particular range are on different pages.

23. The memory system of claim 22, wherein the controller further includes a key range table that includes a number of entries that each have an offset that indicates the number of physical sectors skipped when writing data associated with LAs other than a group of LAs associated with a respective entry.

24. The memory system of claim 23, wherein the offset associated with each of the number of key range table entries is determined by accumulating offsets from each preceding key range table entry.

25. A memory system, comprising:
non-volatile memory; and
a controller coupled to the non-volatile memory and configured to:
determine a number of LBA offsets, wherein each of a number of encryption keys are applied to data associated with a respective one of the number of LBA offsets and each of the number of LBA offsets corresponds to a number of unwritten physical sectors on a last page of data having one of the number of encryption keys applied to the data and wherein the number of unwritten physical sectors are unwritten as a result of a write operation that included data associated with different groups of logical address (LAs) skipping the number of unwritten physical sectors so that data associated with each of the different groups of LAs are on different pages;

receive an LBA associated data having a particular encryption key of the number of encryption keys applied to the data; and translate the received LBA to a physical location using the LBA offset corresponding to data having the particular encryption keys applied to the data.

26. The memory system of claim 25, wherein the number of LBA offsets are in a key range table and each of the number of LBA offsets includes a sum of the number of unwritten physical sectors on last pages of data having all of the encryption keys applied to data associated with respective previous offsets in the table.

\* \* \* \* \*